(12) United States Patent
Pollack et al.

(10) Patent No.: US 9,755,788 B2
(45) Date of Patent: Sep. 5, 2017

(54) MESSAGES WITH ATTENUATING RETRANSMIT IMPORTANCE

(71) Applicant: Apple Inc., Cupertino, CA (US)

(72) Inventors: Daniel B. Pollack, San Francisco, CA (US); Justin N. Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 14/475,496

(22) Filed: Sep. 2, 2014

(65) Prior Publication Data

US 2015/0349926 A1 Dec. 3, 2015

Related U.S. Application Data

(60) Provisional application No. 62/005,586, filed on May 30, 2014.

(51) Int. Cl.
| | |
|---|---|
| *H04L 1/18* | (2006.01) |
| *H04W 88/02* | (2009.01) |
| *H04L 1/08* | (2006.01) |
| *H04W 76/06* | (2009.01) |
| *H04L 1/00* | (2006.01) |
| *G06F 21/64* | (2013.01) |
| *H04W 52/02* | (2009.01) |
| *H04W 84/12* | (2009.01) |

(52) U.S. Cl.
CPC ............ *H04L 1/188* (2013.01); *H04L 1/1874* (2013.01); *G06F 21/64* (2013.01); *H04L 1/0005* (2013.01); *H04L 1/08* (2013.01); *H04L 1/189* (2013.01); *H04W 52/0206* (2013.01); *H04W 76/068* (2013.01); *H04W 84/12* (2013.01); *H04W 88/02* (2013.01)

(58) Field of Classification Search
CPC ..... H04W 88/02; H04W 88/08; H04W 84/12; H04W 52/0206; H04W 76/068; H04L 1/0005; H04L 1/08; H04L 1/189; G06F 21/64
USPC .................. 370/311, 315; 375/295; 709/203; 714/748, 749
See application file for complete search history.

(56) References Cited

U.S. PATENT DOCUMENTS

| | | | |
|---|---|---|---|
| 2003/0235196 A1* | 12/2003 | Balachandran | H04L 47/10 370/392 |
| 2006/0077724 A1* | 4/2006 | Chikusa | G06F 11/1076 365/189.05 |

(Continued)

*Primary Examiner* — April Y Blair
*Assistant Examiner* — Sazzad Hossain
(74) *Attorney, Agent, or Firm* — Kilpatrick Townsend & Stockton LLP

(57) ABSTRACT

Certain data packets for transmission between a first device and a second device may have an importance that changes depending on different circumstances. After the data packet is initially communicated from the first device to the second device, if an acknowledgement is not received at the first device, the first device may retransmit the data packet. If no acknowledgement is received after a certain period of time, communication of the data packet may be considered to have a lower importance, and so additional retransmissions bay be delayed until a retransmission trigger is identified. Examples of such a trigger may be powering on of an antenna for a second different data packet transmission, or identification that a subsequent data packet was successfully received by the second device.

25 Claims, 8 Drawing Sheets

(56) References Cited

U.S. PATENT DOCUMENTS

| | | | |
|---|---|---|---|
| 2006/0268794 A1* | 11/2006 | Sekhar | H04L 45/00 370/338 |
| 2007/0073828 A1* | 3/2007 | Rao | H04L 67/1097 709/217 |
| 2007/0079208 A1* | 4/2007 | Shvodian | H04L 1/1607 714/749 |
| 2007/0113085 A1* | 5/2007 | Naslund | H04L 9/12 713/168 |
| 2009/0303998 A1* | 12/2009 | Rao | H04L 1/187 370/392 |
| 2009/0313519 A1* | 12/2009 | Nagaraja | H04L 1/0042 714/751 |
| 2010/0075703 A1* | 3/2010 | Imai | H04B 7/0417 455/501 |
| 2010/0130174 A1* | 5/2010 | Venkob | H04M 3/533 455/412.2 |
| 2011/0246568 A1* | 10/2011 | Morimoto | G06F 17/30861 709/203 |
| 2011/0258329 A1* | 10/2011 | Lee | H04L 63/0815 709/227 |
| 2012/0163279 A1* | 6/2012 | Tran | H04Q 9/00 370/312 |
| 2014/0044028 A1* | 2/2014 | Nammi | H04B 7/0417 370/311 |
| 2014/0148091 A1* | 5/2014 | Husar | H04W 4/06 455/3.01 |
| 2015/0085863 A1* | 3/2015 | Wu | H04L 45/742 370/392 |
| 2015/0271742 A1* | 9/2015 | Moskowitz | H04W 4/025 370/328 |

* cited by examiner

MESSAGES WITH ATTENUATING RETRANSMIT IMPORTANCE

CROSS-REFERENCES TO RELATED APPLICATIONS

The present application claims priority from and is a nonprovisional application of U.S. Provisional Application 62/005,586 entitled "MESSAGES WITH ATTENUATING RETRANSMIT IMPORTANCE" by Pollack et al. (Ref. No. P23190USP1), filed May 30, 2014, the entire contents of which are herein incorporated by reference for all purposes.

The present application is also related to U.S. Provisional Applications:
62/005,550 entitled "ANSWER AND HOLD WITH CLIENT AND HOST" by Rauenbuehler et al. (Ref. No. P23172USP1), filed May 30, 2014;
62/005,534, entitled "ANSWERING A CALL WITH CLIENT THROUGH A HOST" (Ref. No. P23171USP1), filed May 30, 2014;
62/005,565 entitled "PROXIED PUSH" by Pollack et al. (Ref. No. P23053USP1), filed May 30, 2014;
62/005,336 entitled "SMS PROXYING" by Circosta et al. (Ref. No. P23192USP1), filed May 30, 2014;
62/005,505 entitled "MANAGING CONNECTIONS OF A USER DEVICE" by Schobel et al. (Ref. No. P23295USP1), filed May 30, 2014;
62/005,606 entitled "CLIENT APPLICATIONS COMMUNICATING VIA A USER TUNNEL" by Tung et al. (Ref. No. P23188USP1), filed May 30, 2014;
62/005,565 entitled "Application-Level Acknowledgements" by Pollack et al. (Ref. No. P23189USP1), filed May 30, 2014; and
62/005,799 entitled "PROTOCOL SWITCHING IN INTER-DEVICE COMMUNICATION" by Prats et al. (Ref. No. P22319USP1), filed May 30, 2014, which are hereby incorporated by reference for all purposes. The present application is also related to U.S. Provisional Application 61/953,591 entitled "DYNAMIC LINK ADAPTATION FOR IMPROVED LINK MARGIN," by Liu et al., filed Mar. 14, 2014, which hereby incorporated by reference for all purposes.

BACKGROUND

The disclosure generally relates to retransmission of data packets between devices.

In communications between devices, different types of data packets may have differing levels of importance. High importance communications may require that significant resources be placed into insuring that a communication is either correctly transmitted and received, or that an error is presented to a user as soon as possible if there is a transmission failure. This may involve significant power use during retransmission of data packets. This may also result in a lower quality user experience as errors are given to a user.

Low importance messages may be sent with no or few resources at all used to verify that these messages are correctly communicated. While this may result in power savings, an inconsistent user experience may result, with the messages or user experience changing based on opaque transmission issues that are not presented to the user as errors.

BRIEF SUMMARY

Embodiments relate to methods, systems, and devices for providing messages with attenuating retransmit importance.

For example, certain data packets for transmission between a first device and a second device may have an importance that changes depending on different circumstances. After the data packet is initially communicated from the first device to the second device, if an acknowledgement is not received at the first device, the first device may retransmit the data packet. If no acknowledgement is received after a certain period of time, communication of the data packet may be considered to have a lower importance, and so additional retransmissions may be delayed until a retransmission trigger is identified. Examples of such a trigger may be powering on of an antenna for a second different data packet transmission, or identification that a subsequent data packet was successfully received by the second device.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Embodiments described herein relate to devices, systems, and methods for retransmission of data packets. In particular, the processes used to implement retransmission may change as a retransmission importance changes.

For example, in certain embodiments, a first phone (or other device) may have instructions to transmit a read receipt message to a second phone. The read receipt message may indicate that a previously received text message from the second device was displayed on an output of the first device. The read receipt message may be flagged by the first phone as having an attenuatable importance for retransmission. After transmission of the read receipt message, if an acknowledgement of the read receipt message is not received from the second phone, the first phone may retransmit the read receipt message one or more times during a predetermined retransmit period. If an acknowledgement is not received from the second phone based on these retransmissions, the first phone can stop retransmitting the read receipt.

The importance of providing the read receipt may be considered attenuated if the initial transmission and retransmission fails after a certain period of time, thereby lowering the importance of transmitting the message. The first phone may then store a copy of the read receipt for later transmission. A trigger may be identified and used to initiate a subsequent retransmission of the read receipt. Such triggers may include an antenna being powered on for transmission of a different message, identification that another message is being sent to the second device, or any other such triggers that may identify an efficient time to attempt additional retransmissions of the read receipt message. This process of terminating retransmission processes and beginning them again may repeat until an acknowledgement is received at the first phone.

I. INTRODUCTION

Figure 1:
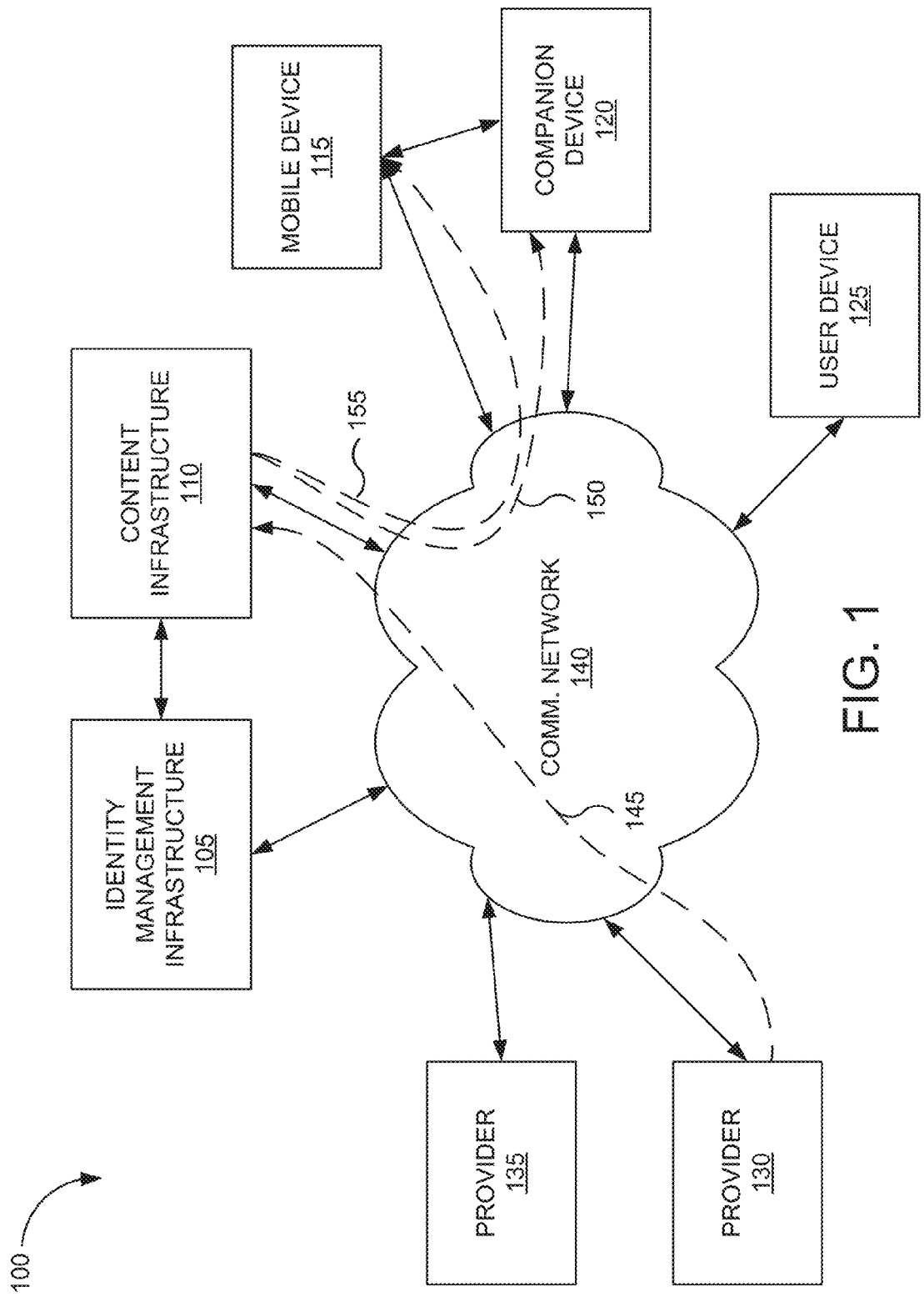
FIG. 1 is a block diagram of a system composed of one or more clients, hosts (e.g., a companion device), and servers communicating messages among each other according to various embodiments.

In additional embodiments, network servers may interact with the management processes to assist with the communications. For example, a management framework or management proxy may exist in a communication path between the phone and the device. Such a management proxy may assist with retransmission of data that is not correctly processed, and may provide other information to the devices to assist with communications between the devices A. System FIG. 1 is a block diagram of a system 100 according to various embodiments. FIG. 1 and other figures are merely illustrative of an embodiment or implementation, or of aspects of an embodiment or implementation disclosed herein, and should not limit the scope of any invention as recited in the claims. One of ordinary skill in the art may recognize through this disclosure and the teachings presented herein other variations, modifications, and/or alternatives to those embodiments or implementations illustrated in the figures. FIG. 1 is one example of a system which may use message retransmission with attenuating importance according to various embodiments. The devices in system 100 can include hardware and/or software elements.

In one embodiment, system 100 includes an identity management infrastructure 105 (i.e., one or more servers that implement an identity management service, authorization service, and/or authentication service), content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). As illustrated, mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified. As part of identity management, one or more host devices may be identified and associated with one or more client devices, such that incoming calls, text messages, or other communications to the host devices may be relayed to the client devices. In certain embodiments, communications as part of these processes may use retransmission with attenuating importance.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In further embodiments, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In various embodiments, identity management infrastructure 105 can receive a single user identifier, which is used to determine device identifiers for devices associated with the user identifier. During entity registration, in order to access services or resources managed by identity management infrastructure 105, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, the content sent to mobile device 115 can be forwarded to companion device 120 for delivery to mobile device 115. Companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call between devices as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., Wi-Fi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of system 100 illustrated in FIG. 1, in one embodiment, the operation can be to forward or otherwise communicate a notification message from provider 130 to companion device 120 as illustrated by path 145. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device.

B. Content Infrastructure

Figure 2:
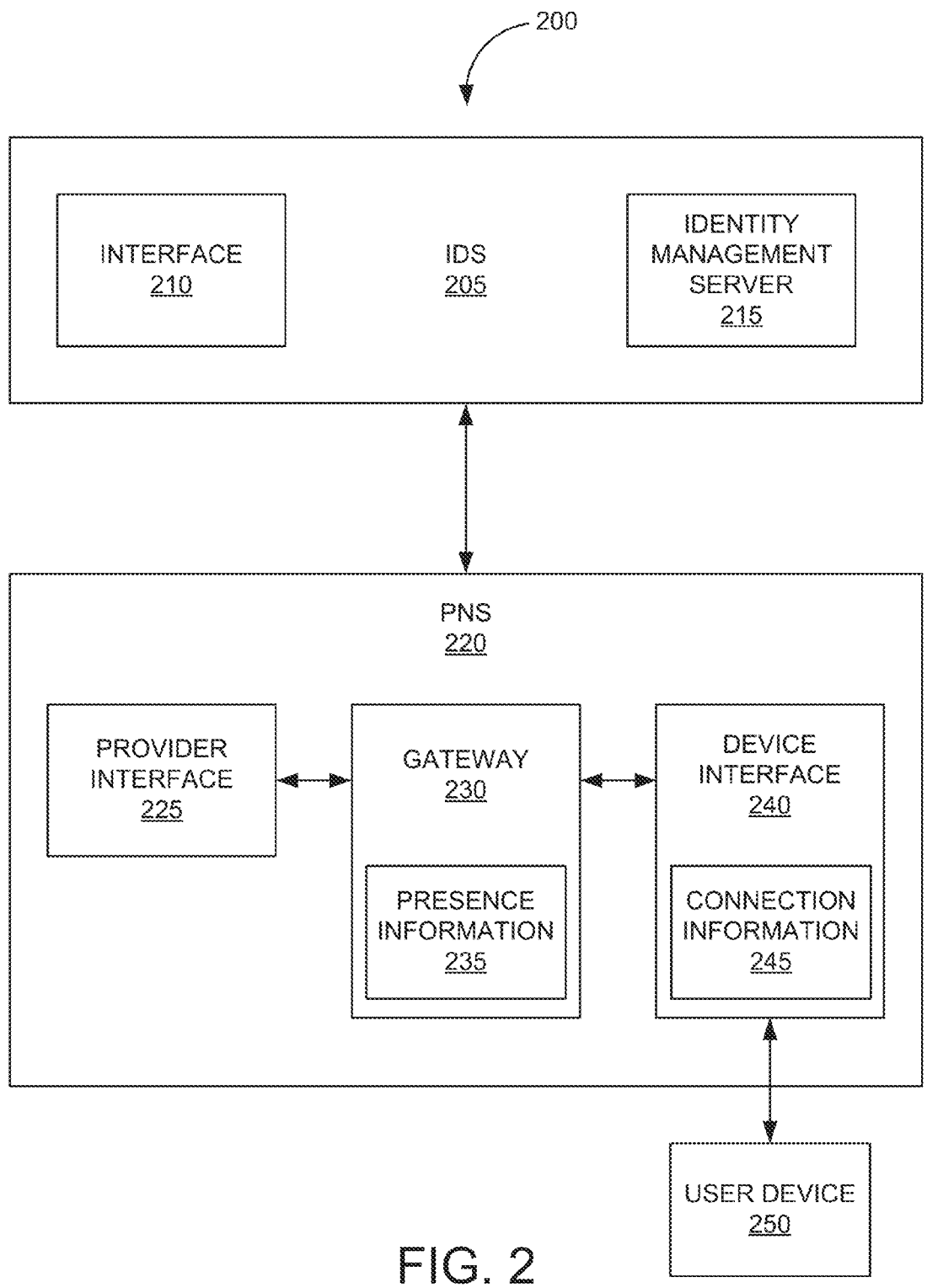
FIG. 2 is a block diagram of system that provides push notification services and that can be used according to various embodiments.

FIG. 2 is a block diagram of system 200 that may use retransmission with attenuating importance for certain communications. In particular, IDS services as described herein, including IDS 205, may be used to facilitate discovery and communication between a devices that a party to a communication which may use retransmission with attenuating importance. System 200 can be embodied as content infrastructure of FIG. 1 in various embodiments.

In particular, FIG. 2 illustrates various examples of forwarding content (e.g., notification messages and phone/video calls) between devices, e.g., between providers and mobile devices, or between a sending device of one user and receiving devices of another user). In these examples, system 200 is shown with identity services (IDS) 205 having interface 210 and identity management server (IMS) 215 and push notification services (PNS) 220 having provider interface 225, gateway 230 having presence information 235, device interface 240 having connection information 245, and user device 250. Each service may be implemented using hardware and/or software elements.

In one aspect, IDS 205 may be embodied as or form part of identity management infrastructure 105. IDS 205 may be implemented in various embodiments using a single server computer system or may include multiple server computer systems, web servers, application servers, networks, interconnects, and the like. Interface 210 can enable an entity (e.g., mobile device 115 or provider 130) to connect (e.g., via a network) in order to take advantage of service provided by IDS 205. Interface 210 may incorporate load balancing and other connection management techniques allowing entities to communicate with Identity management server 215.

In one embodiment, an entity sends information such as an authentication certificate that is received via interface 210 upon an initial connection to IDS 205 or to a service, resource, or application managed by IDS 205 (e.g., PNS 220). Identity management server 215 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 220, entities and their devices may be required to possess certain certificates, certificate authority (CA) certificates, or tokens.

In one embodiment, each provider of content uses a unique provider certificate and private cryptographic key for validating their connection with PNS 220. This certificate can be provisioned by identity management server 215 and identify the provider and/or a particular topic published by the provider. In general, the topic is a bundle ID of a client application. The provider may optionally wish to validate the service, to which the provider is connected, using a public server certificate provided by PNS 220. In various aspects, the provider uses the public server certificate passed to it by identity management server 215 when registering to authenticate the service to which the provider has connected.

Identity management server 215 may also issue to each device, which desires to receive content, a unique private key and certificate that the device uses to authenticate itself to identity management server 215 and establish a connection to PNS 220. A device usually obtains a device certificate and key from identity management server 215 during device activation and stores them in a keychain. The device also holds its particular device token, which it receives during the service connection process. Each client application that utilizes PNS 220 is responsible for delivering this token to its content provider.

Identity management server 215 may store any necessary certificates, CA certificates, and cryptographic keys (private and public) for validating connections and the identities of providers and devices.

In this example, once the entity is trusted, system 200 allows the entity to utilize push notification services provided by PNS 220. PNS 220 may be implemented in various embodiments using a single server computer system or may include multiple server computer systems, web servers, application servers, networks, interconnects, and the like. The entity may be a provider or other notification provider desiring to connect with PNS 220 (e.g., via a network). As alluded to above, in one embodiment, provider interface 225 provides a high-speed, high-capacity interface allowing push notification providers to communicate with PNS 220. Provider interface 225 may incorporate load balancing and other connection management techniques allowing entities to communicate with PNS 220. Although provider interface 225 is shown as being linked to gateway 230, provider interface 225 may be incorporated into gateway 230 or device interface 240. As discussed above, a user device can be a provider of content in various embodiments as well as be a destination of content routed using PNS 220.

Gateway 230 may be implemented in various embodiments using a single server computer system or may include multiple server computer systems, web servers, application servers, networks, interconnects, and the like. Gateway 230 can determine the destination of content (e.g., push messages or call messages) received via provider interface 225 or device interface 240. In various embodiments, gateway 230 can determine a destination based on presence information 235. In one aspect, presence information 235 is maintained using a device's push token. Accordingly, when a push notification is received at gateway 230 directed to a particular push token, gateway 230 can perform a lookup to determine whether there is a TCP socket descriptor associated with that push token. The socket descriptor can provide the TCP socket information and other networking information needed to transmit the push notification. In various aspects, presence information 235 includes mappings between authenticated entities and their connections to PNS 220. These connections can be utilized by PNS 220 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

In some embodiments, in order to scale handling of connections from an increasing number of users, devices, and providers utilizing services of PNS 220, device connections in presence information 235 (or the devices themselves) may be managed according to at least one grouping or logical partition called a zone. Functions performed by gateway 230 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 230 may be partitioned out to multiple servers to handle corresponding device connections (e.g., device interface 240).

In various embodiments, gateway 230 is linked to device interface 240. Device interface 240 provides an interface to communicate with user device 250. Device interface 240 may incorporate load balancing and other connection management techniques allowing devices to communicate with PNS 220. Although device interface 240 is shown as being linked to gateway 230, device interface 240 may be incorporated into gateway 230 or provider interface 225.

Device interface 240 in these examples allows presence information 235 to be generated when device interface 240 is connected to user device 250. User device 250 can assert its presence to PNS 220 upon establishing a persistent connection. Device interface 240 then generates a device/connection mapping in connection information 245. Device interface 240 can back-propagate connection information 245 to gateway 230 allowing gateway 230 to generate a device/connection mapping in presence information 235. In one aspect, presence information 235 includes a device/courier mapping or link allowing gateway 230 to determine an appropriate courier that acts as device interface 240 connected to user device 250. The courier utilizes connection information 245 (including any device/connection mappings or links) allowing the courier to determine connection information specific to user device 250 that can be used to deliver content to user device 250. In another aspect, presence information 235 and connection information 245 may be substantially identical in that they include correspondences between a given device and its connection with PNS 220.

In various embodiments, a device wishing to receive content via PNS 220 sends authentication information either upon an initial connection with device interface 240 or directly to IDS 205. Identity management server 215 can receive the authentication information either directly or indirectly and then authenticate and authorize the device or its associated user or organization as a registered and authorized entity. Once the device is trusted, PNS 220 is informed and PNS 220 thereafter manages any connections made between the device and PNS 220 (such as with device interface 240 in connection information 245). Device information available at device interface 240 in connection information 245 can be periodically back-propagated to gateway 230 to generate or update presence information 235.

When the device initially connects with PNS 220, PNS 220 provisions the device. In various embodiments, a zone is provisioned for the device as alluded to above. Despite a particular zone assignment for each device, devices may lose their connection with device interface 240 for various reasons. For example, a connection might be lost due to loss of cellular signal, or Wi-Fi signal, loss of power, or because a mobile device has changed geographic locations, etc. In other aspects, a connection may be intermitted as opposed to being persistent in order to conserve power or achieve other efficiency metrics.

When user device 250 attempts to reconnect to PNS 220, user device 250 can connect with any courier acting as device interface 240. In embodiments where device connections are assigned to at least one grouping or zone, device interface 240 may provision a connection with one or more servers of gateway 230 that are assigned to handle the zone of a connecting device. For example, if device interface 240 is connected to user device 250 that is assigned to zone 1, then device interface 240 can provision a connection with one or more servers responsible for managing zone 1. Device interface 240 may then back-propagate device information for user device 250 to the one or more servers responsible for managing zone 1. In similar fashion, device interface 240 may make connections with servers of different zones to back-propagate specific device information for devices associated with those respective zones ensuring that no matter where or how user device 250 connects to PNS 220, presence information 235 is up to date and available to determining how to route the content. In some embodiments, device interface 240 can be specific to a wireless carrier or internet service provider (ISP) allowing PNS 220 to support the protocols or physical connections specific to multiple third party entities.

According to one example, when gateway 230 receives content from provider interface 225, gateway 230 forwards the content received from provider interface 225 to device interface 240 based on its mappings in presence information 235. Device interface 240 can deliver the content received from gateway 230 to user device 250 for which information about a persistent connection is maintained in connection information 245.

Upon receiving content from gateway 230, device interface 240 can perform a lookup or otherwise consult its device connections in connection information 245 and send the content received from gateway 230 to the appropriate device, for example, over the persistent connection associated with user device 250. In one aspect, device interface 240 inspects the device token associated with the content to be delivered and determines whether a match is found between the device token and the connections that device interface 240 manages in connection information 245. Device interface 240 can deliver the content using the connection established by the device having the given device token.

In one example of operation, user device 250 subscribes to a particular application managed by a provider and desires to receive notification messages for that application via PNS 220. Thus, user device 250 calls the provider either directly via a communications network or utilizing PNS 220 and transmits its device token to the provider. The device token or its transmission may include not only a device's identification information but may include an encrypted combination of a device's UID and its zone identifier allowing PNS 220 to provision connection information for the device according to the appropriate resources allocated to the zone.

When the provider sends a notification message to the particular application on user device 250, the provider connects to PNS 220 using provider interface 225 and sends the message to gateway 230. Even if user device 250 is associated with a particular zone, the provider does not need to connect to any particular gateway of PNS 220 to successfully push a notification message to user device 250. For example, if gateway 230 receives content from provider interface 225 and the content has a device token, gateway 230 will look at the token and either route the message to an appropriate server of PNS 220 (which may route the message to device interface 240 or another courier of PNS 230) or route the message directly to device interface 240.

If gateway 230 is the designated gateway, gateway 230 sends/forwards the message to device interface 240 based on its device/courier mapping in presence information 235 in some embodiments. Device interface 240 is then able to lookup its connections in connection information 245 and send the message to the device over the persistent connection established by the device with device interface 240. In summary, in cases where PNS 220 receives a message having a particular destination, a gateway of PNS 220 forwards that message directly to an appropriate courier of PNS 220 using a device/courier mapping that was established when a device connects to PNS 220. In further embodiments, gateway 230 can send/forward the message directly to user device 250 based on its device/connection mapping in presence information 235. Gateway 230 can generated this mapping information from various sources to each of which a device has established a connection.

II. MESSAGES WITH ATTENUATING RETRANSMIT IMPORTANCE

A. System and Device Operation Embodiment

Figure 3:
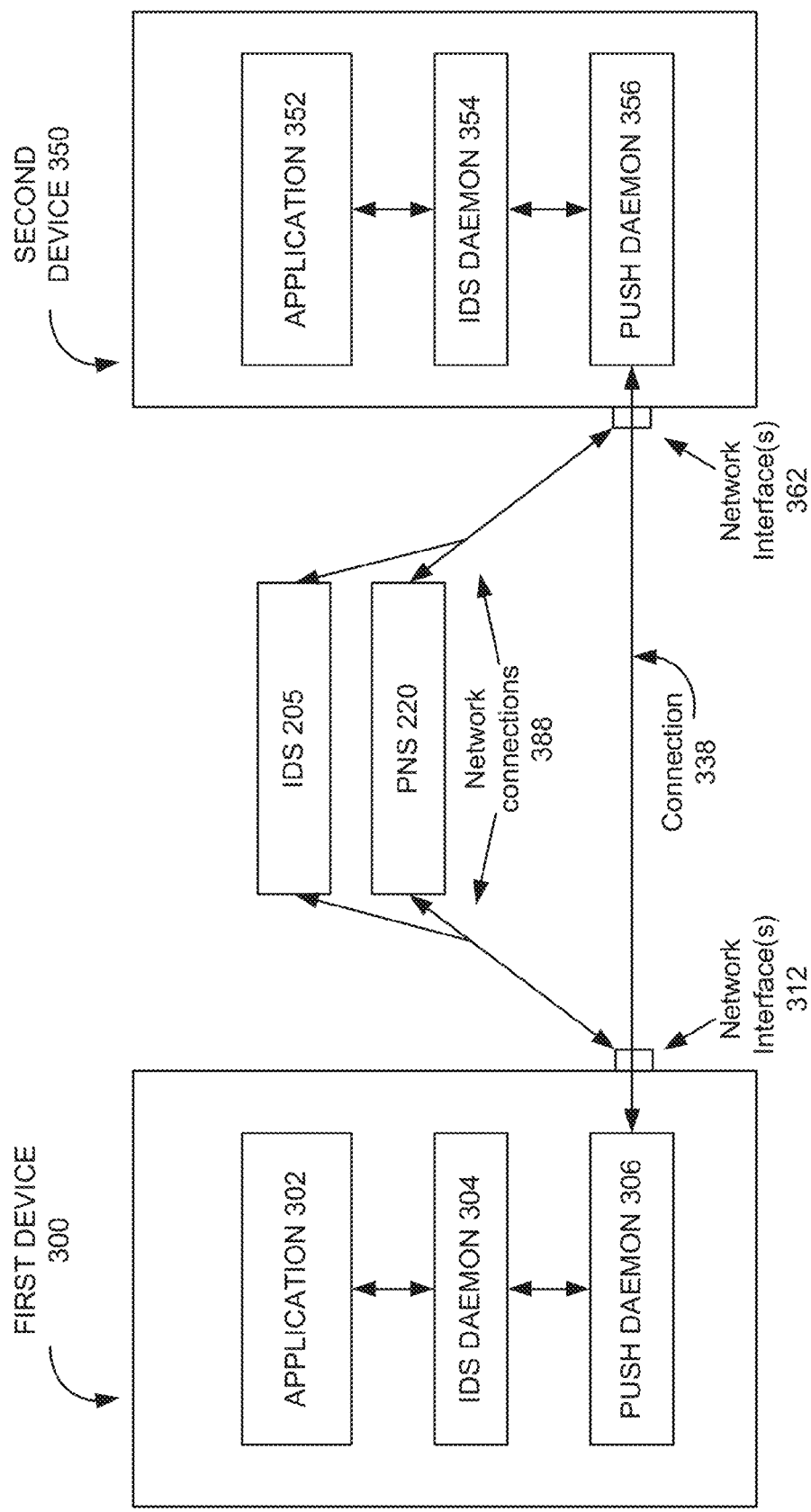
FIG. 3 is a diagram of first and second devices that may use messaging with attenuating retransmit importance in communication with one another according to various embodiments.

FIG. 3 is a diagram of first and second devices that may use messaging with attenuating retransmit importance in communication with one another according to various embodiments. FIG. 3 includes first device 300, second device 350, IDS 205, and PNS 220. These devices may be connected by network connections 388 and connection 338.

Devices 300 and 350 may be any device accessible by a network interface, including a desktop computer, a laptop computer, a smartphone, a tablet computer, a wearable device (e.g. a network enabled watch, earpiece, or necklace,) a networked appliance (e.g. a network enabled refrigerator or clothes washer,) media player, personal digital assistant, key fob, access card, multi-function device, game system, or any other such client device. Any device, client device, mobile device, host device, or any other such device described herein will include processing resources, memory resources, and networking resources. One embodiment of a device illustrating such resources is shown and described with respect to FIG. 7, though it will be apparent that other structures for a device may be possible according to different embodiments.

Different embodiments may implement connection 338, network connections 388, or aspects of these connections using one or more communication protocols or technologies, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), synchronous optical network (SONET), Ethernet (IEEE 802.3), or any other suitable communication protocol, including communication protocols not yet developed as of the filing date of this document. A host or client device can include wireless circuitry as part of wireless interfaces, such as network interface 312, network interface 362, and wireless interface 364, that can communicate over several different types of wireless networks depending on the range required for the communication. For example, a short-range wireless transceiver (e.g., Bluetooth), a medium-range wireless transceiver (e.g., Wi-Fi), and/or a long range wireless transceiver (e.g., GSM/GPRS, UMTS, CDMA2000 1×/EV-DO and LTE/LTE-Advanced) can be used depending on the type of communication or the range of the communication.

Connection 338 in particular may, in certain embodiments be implemented as a peer to peer (P2P) wireless connection directly between network interface 312 and network interface 362. In other embodiments, connection 338 may include multiple additional devices and sub-connections, including multiple access points, network routing connections, and communication servers.

Wireless circuitry may be used in conjunction with wireless interfaces such as wireless implementations of network interfaces 312 or 362 to send and receive information over wireless connections such as connections 338 and 388. Any device described herein may additionally include conventional circuitry such as an antenna system, an RF transceiver, one or more amplifiers, a tuner, one or more oscillators, a digital signal processor, a CODEC chipset, memory, etc. to enable various wireless connections as described herein.

Circuitry of network interfaces 312 and 362 may be coupled to processing resources of their respective devices. Data packets received by circuitry of an interface may be sent to one or more processors via peripheral interfaces. The processing resources of first device 300 may be used to implement client device processes such as application 302, IDS daemon 304, and push daemon 306. Similarly, processing resources of second device 350 may be used to implement device processes such as application 352, IDS daemon 304, and push daemon 306.

A daemon as described herein is a process that may be implemented in hardware, firmware, or software on a computing device. A daemon runs as a background process rather than being under the direct control of a user.

IDS daemon 304 may function as a service operating on first device 300 to work with IDS 205 to provide device identities for use in communication processes. Any service described above for IDS 205 may function, in part, using IDS daemon 304 to implement local aspects of identity services for device 300. In certain embodiments, for example, IDS daemon 304 may communicate with IDS 205 via network interface 312 to receive a second device identity with is associated with second device 350. This may enable addressing for communications from first device 300 to second device 350 that use retransmission with attenuating importance. IDS daemon 354 may provide similar functionality for second device 350.

Also similarly, push daemon 306 may function as a service operating on first device 300 to work with PNS 220 to provide push services for use in communication processes. Any service described above for PNS 220 to provide push functionality may, in part, function using push daemon 306 to implement local aspects of push services for device 300. In certain embodiments, push daemon 306 may receive communications from PNS 220 identifying connections with second device 350 that may be used for transmission of data packets with attenuating importance In certain embodiments, push daemon 306 may manage retransmission of data packets that are subject to retransmission with attenuating importance. For example, application 302 may communicate such a data packet to application 352 of second device 350. IDS daemon 304 may either communicate with IDS 205 or have previous information from IDS 205 that provides addressing information necessary for such a communication. Push daemon 306 may manage the initial transmission and associated retransmissions. For example, push daemon 306 may receive the data packet or a payload of the data packet from client 302, and may prepare the data packet for transmission.

Push daemon 306 may include retransmission timing modules that initiates automatic retransmission of an acknowledgment is not received. Push daemon 306 may also include a timer or a set of triggers for terminating retransmission attempts. A trigger for terminating retransmission may be based on a power level associated with a battery of first device 300, a combination of power level and elapsed time, a metric based on other transmissions occurring in close proximity to any retransmission, or any other such trigger. In other embodiments, a separate communication module may manage portions or any aspect of such a transmission or retransmission.

Additionally, IDS daemon 304 may manage certain aspects of retransmission. For example, in certain embodiments, IDS 205 may provide an identity which is the target of the particular data packet, with second device 350 being associated with the identity. If, after a delay where no retransmissions were attempted, the IDS 205 identifies that another device associated with the identity is in use, the retransmission of the data packet may be redirected from second device 350 to the other device associated with the target identity. Similarly, during a period when no retransmissions are attempted, PNS 220 may identify a change in the availability or in connections available to second device 350 or to another device associated with the target identity. PNS 220 may communicate with first device 300 to enable a subsequent retransmission using push daemon 306 to use updated information in retransmission of the data packet.

B. Decision Tree

Figure 4:
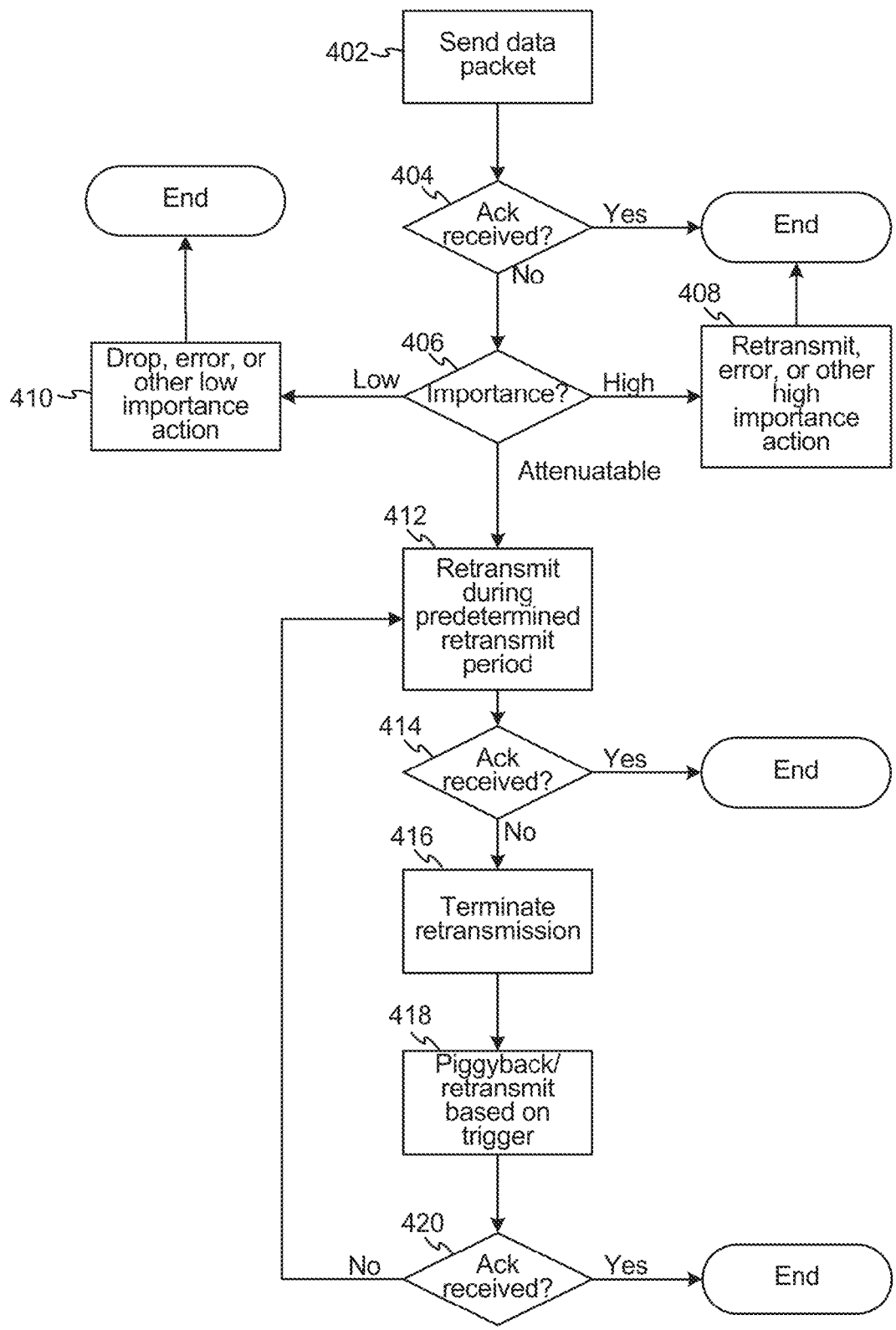
FIG. 4 illustrates a decision tree for data packets with attenuating retransmit importance according to various embodiments.

FIG. 4 illustrates a decision tree for data packets with attenuating retransmit importance according to various embodiments. Such a method may be implemented using devices in a system similar to those shown in FIG. 3 or 7, or using any other such devices and network.

At block 402, the data packet is sent during an original transmission from a first device to a second device. The sending of the data packet can be prompted by any processing on the first device that requires data to be sent to the second device.

At block 404, it is determine whether an acknowledgement of the original transmission sent in block 402 has been received. If an acknowledgement to the original transmission has been received, then the process terminates. If an acknowledgement is not received within an initial acknowledgement time period, then an additional decision may be made. In various embodiments, this decision may be processed at the time of transmission, at the timeout period, or at any time prior to a subsequent action.

At block 406, an importance of the data packet is determined. The importance can be any classification, e.g., numerical values or by text. A level of importance can correspond to certain ranges of importance. The importance can be determined based on a variety of factors, such as the application sending the data packet, a transport protocol, and a flag designated by the sending application or the operating system. In various embodiments, the importance can be high, low, or an attenuating importance.

If the data packet is associated with a high importance, then in block 408, a high importance action may be taken. Examples of a high importance action include high importance retransmission, presentation of a high importance error to a user of the device, or any other such high importance action. A high importance transmission can include a flag identifying the transmission has high priority, and the receiving device can use the flag to identify that an acknowledgement should be sent immediately.

If an initial importance is low, then in block 410 the message may be dropped, with no consideration of subsequent retransmissions or notification to a user. In other embodiments, other low importance actions may be taken. Different embodiments may or may not include the use of such low importance communications.

If the message is identified as having an importance subject to attenuating importance, then the message may or may not be subject to immediate retransmission at block 412. In other alternate embodiments, initial retransmissions may occur before the decision of block 406. Just as with any transmission, if an acknowledgement is received to a retransmission in block 414, then the process will end.

After a certain number of retransmissions in block 412, the system may determine that the message is now no longer of sufficient importance to retransmit. The process for transmission may terminate retransmission in block 416. If retransmission is not terminated, then block 412 may continue, e.g., by retransmitting at specified intervals. Terminating retransmission in block 416 may prevent power from being wasted.

At block 418, the first device may change from a process of current transmission used for sending the data packet in blocks 402 and 412, to a process focused on power efficiency. This efficiency can occur by stopping or reducing power to a transmission system and preventing the system from repeatedly expending power on a low importance data packet when a communication link to a second device may be unavailable. This may also be done without sending an error to a user. A later trigger may cause a retransmission, which can occur in a power efficient manner. A later trigger may be, for example, identifying a change in power associated with the transmission system, such as wireless circuitry, caused by transmission of other data packets.

In block 418, subsequent retransmissions may then be performed based on various efficient processes. For example, a trigger may be used to wait until a different process or data packet communication begins to use the same communication circuitry needed for retransmission of the data packet. The system may identify another data packet being sent to the same second device, and piggyback on that transmission by sending the data packet just after the communication of the other data packet. Further, the system may wait for a higher importance message to the second device to receive an acknowledgement. Such an acknowledgement may indicate that a previously unavailable channel that the data packet was attempting to use has become available. In alternate embodiments, any other such trigger that may identify an efficient process for communicating a retransmission may be used.

If such retransmissions result in an acknowledgement in block 420, then the process will end. If, however, a window of opportunity for exploiting efficiencies ends, then the retransmission process may again be terminated. This may result in a loop from blocks 412 through 420 which repeats any number of times. In various embodiments different loops may be part of a single process, where block 418 may involve a single transmission that loops back to block 416 without a retransmission period, or where the process loops back to block 402 for a subsequent importance determination. In other embodiments, multiple types of triggers may be used during multiple retransmission process loops. In certain embodiments, after a number of retransmission process loops, the importance may again be attenuated in a loop back to block 410, with a subsequent error, message drop, or other action.

C. Retransmission from Trigger

Figure 5:
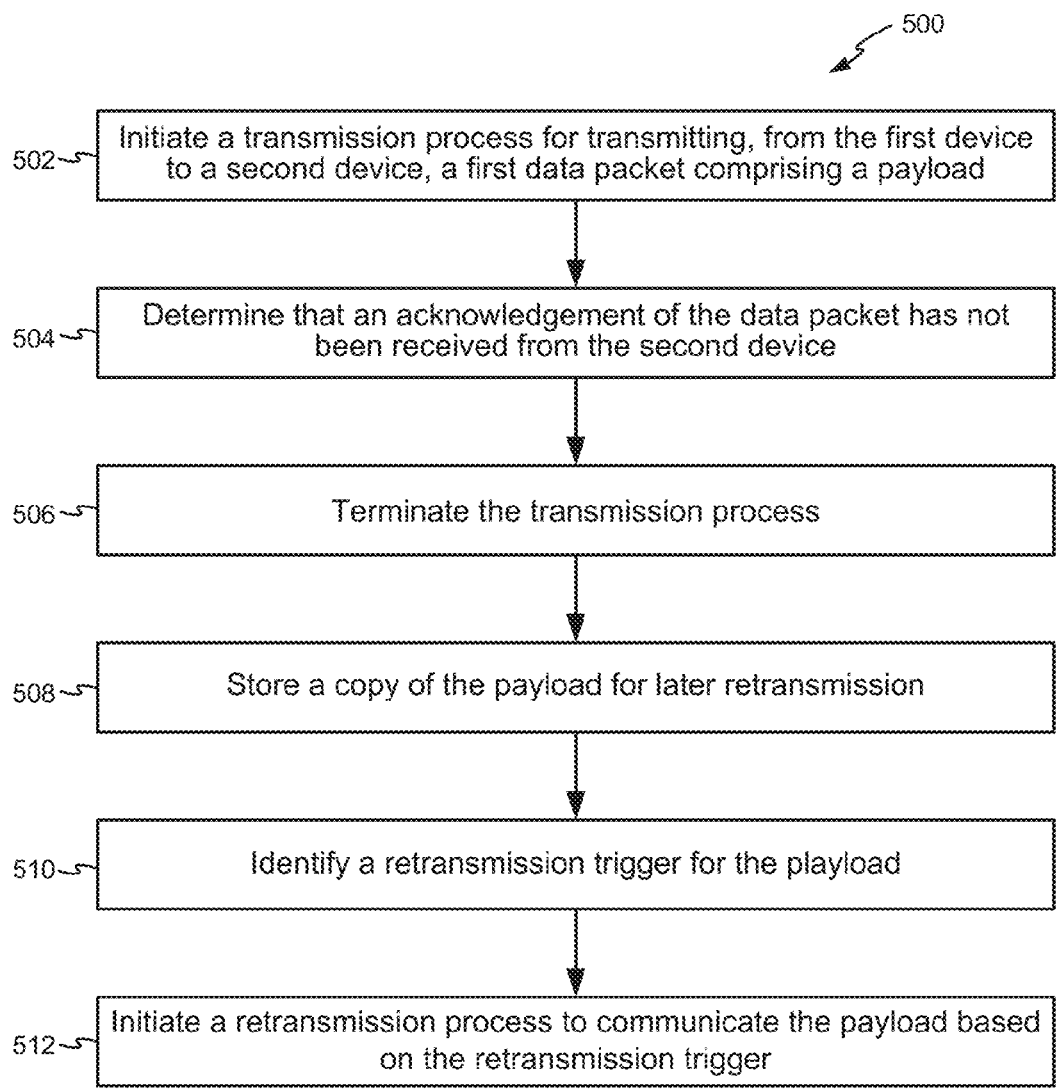
FIG. 5 illustrates a method performed by a sending device for attenuating retransmit importance according to various embodiments.

FIG. 5 illustrates a method performed by a sending device for attenuating retransmit importance according to various embodiments. Such a method may be performed by a first device that is made up of a processor, memory, and wireless circuitry.

At block 502, the first device begins an initial transmission of a first data packet to a second device. The first data packet comprises a payload. The system may have a flag set for data packets (e.g., of messages) where the communication may be subject to an attenuating importance over time. In other embodiments, the data packet may include a field for retransmission importance as an importance value, where the importance value can be used to determine whether the data packet is subject to an attenuating importance. In other embodiments, any such method of identifying the data packet for attenuating retransmission importance may be used.

The payload of the data packet may be any possible information. In many embodiments, the payload may be a time insensitive read receipt, a low priority text message, or any other message. An example message is where an immediate acknowledgement may be efficient for housekeeping purposes, but where the device receiving the message is not delaying another processes that depends on receipt of the message. Another example message is where the message type is low priority, but for different reasons, dropping the message and/or presenting an error are not preferable options.

At block 504, the first device may determine that an acknowledgement of the data packet has not been received from the second device. In various embodiments, this may be based on an expected response time, a trigger such as a system option to power down a wireless communication system, or any other such trigger for checking an expected acknowledgement.

In block 506, the system terminates the transmission process. In various embodiments, this may entail terminating a process of multiple retransmissions while waiting for an acknowledgement. In other embodiments, this may involve a single transmission with no subsequent retransmissions. Terminating the transmission may involve powering down a communication system used for the initial transmission, removing the payload from an active transmission queue, or removing all copies of the payload from an any active communication process so that a copy is only stored in a non-volatile memory for later use. Another example of terminating may involve any step that is an impediment to retransmitting the data packet prior to receiving an acknowledgement from the second device that the data packet has been received at the second device.

In embodiments using an importance value, the importance value may be changed when the transmission process is terminated. In other embodiments, this adjustment may be a standalone processes with a separate block that is associated with the change from a current transmission to a possible triggered future transmission.

At block 508, the first device stores a copy of the payload for later retransmission. The storing may involve managing a copy of the data packet stored in non-volatile memory. As another example, the data packet may be put into a retransmission storage. As another example, an expected deletion of the data packet that would occur upon receipt of the acknowledgement can be blocked. Storing can include any maintenance of a currently existing copy of the payload, along with an indication associating the copy of the payload with possible later retransmission. In various embodiments, blocks 504, 506, and 508 may be performed in any order.

At block 510, a retransmission trigger for the payload may be identified. A trigger may take many different forms, including powering on a communication module, receipt of various other messages, transmission of various other messages, or any system defined trigger. In certain embodiments, multiple different triggers that are associated with different triggering processes may be used for a single data packet. For example, a trigger based on a change in power to wireless circuitry and a trigger based on receipt of a message including an identifier for the second device may both be triggers for a single data packet. In further embodiments, the specific triggers for a data packet may depend on the importance value of the data packet, and changes in the importance value may change which triggers are used to initiate retransmission of a particular data packet.

At block 512, a retransmission process is then initiated based on the identification of the presence of a retransmission trigger to perform a retransmission of the data packet. The retransmission can be performed in accordance with the type of retransmission trigger. For example, the data packet can be retransmitted with another data packet, or just before or just after another data packet, which may be involved in the trigger. A particular communication connection can be used, depending on the type of trigger.

D. Different Time Periods

Figure 6:
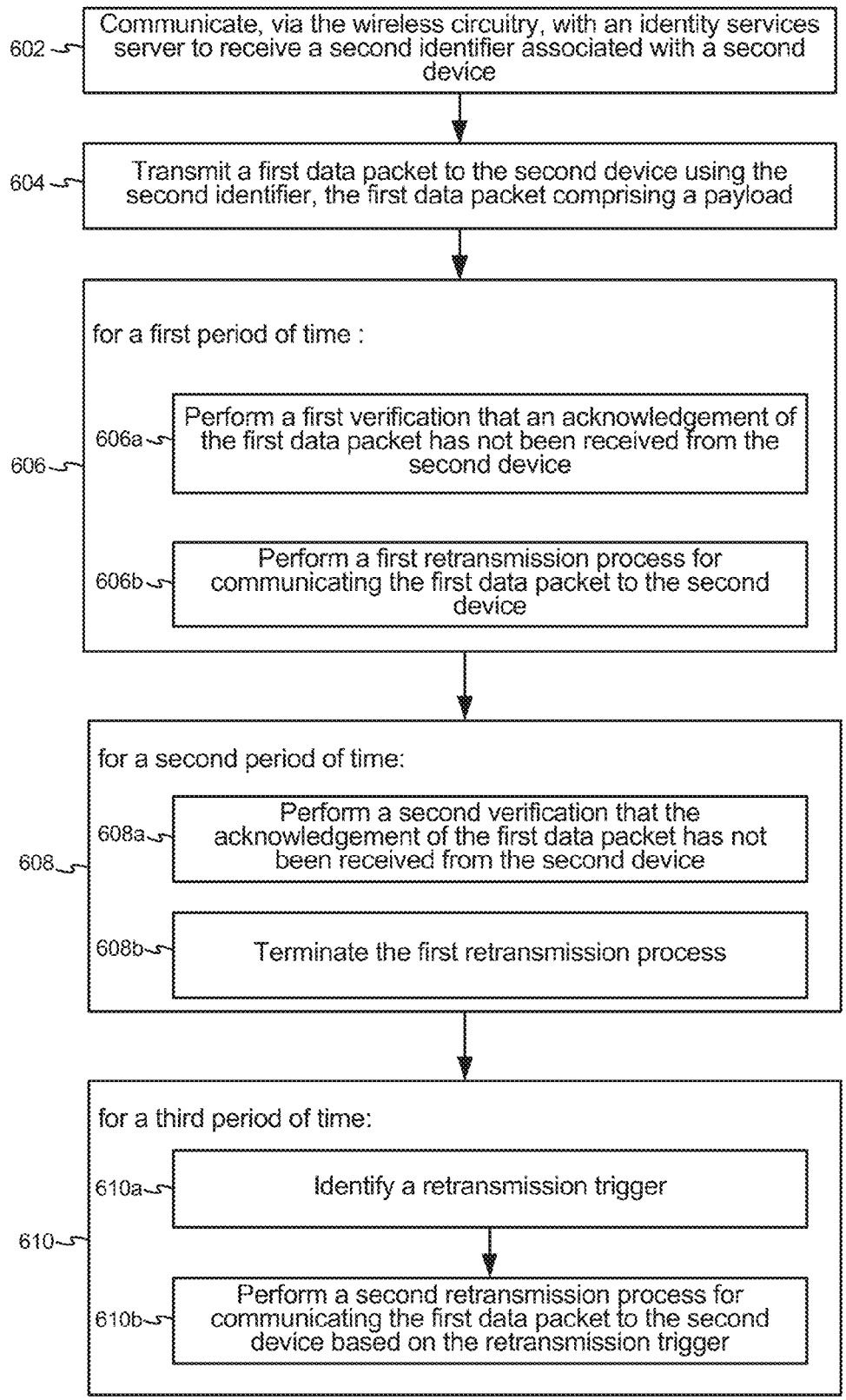
FIG. 6 illustrates a method using different time periods for attenuating retransmit importance according to various embodiments.
Figure 8:
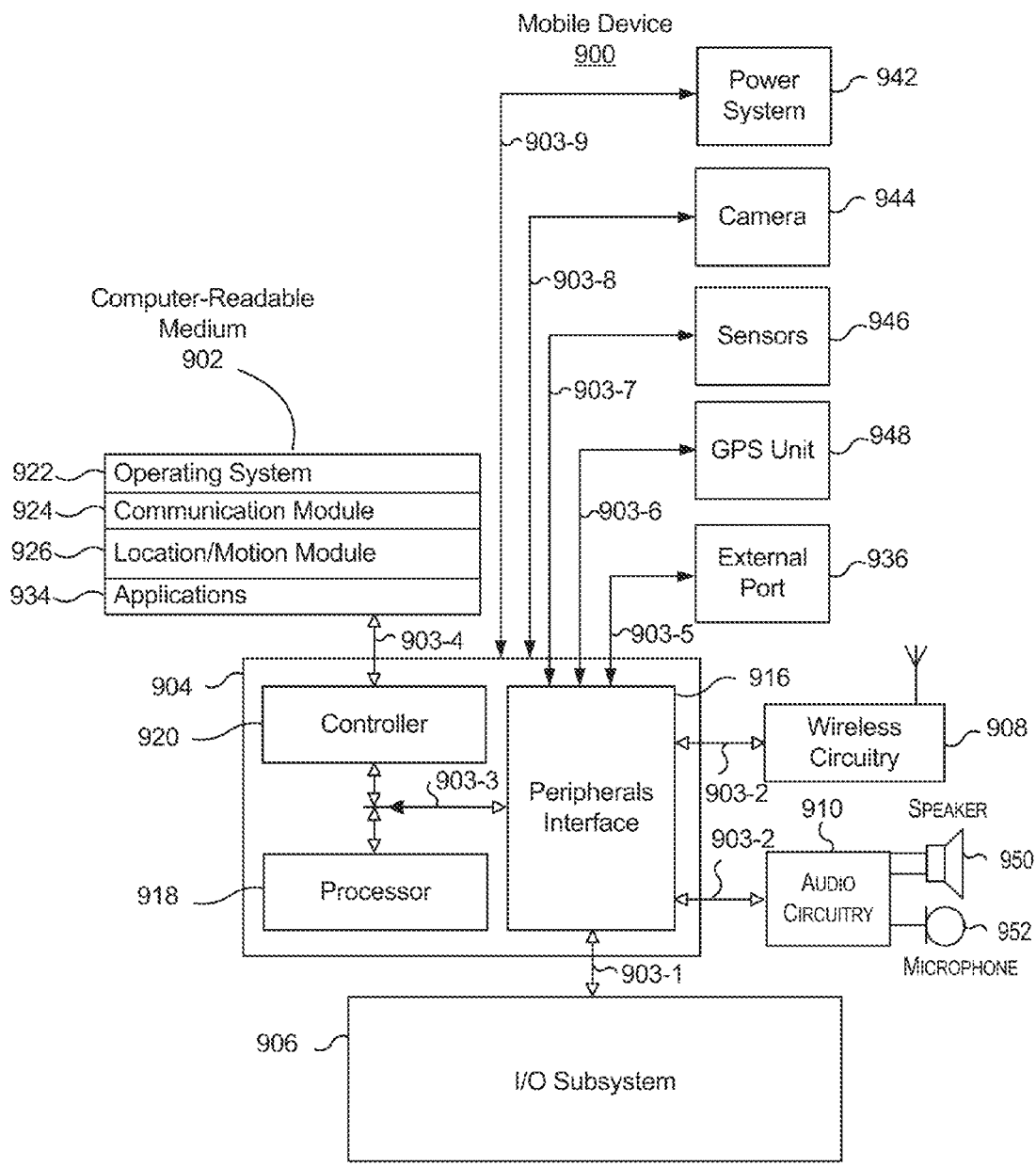
FIG. 8 is a block diagram of a portable electronic device or mobile device according to embodiments of the present invention.

FIG. 6 then describes an additional embodiment of a method for performing retransmission with attenuating importance. Such a method may be performed by a first device such as device 300 of FIG. 3, a mobile device such as mobile device 900 of FIG. 8, or any other such device having a processor, memory, and a network interface.

At block 602, the first device may communicate, via wireless circuitry, with an identity services server to receive a second identifier associated with a second device. As described above, the second identifier may be associated with an account as managed by an identity service. In additional embodiments, the first device may also receive a first identifier for the first device as part of managing identity within a network. The identity service may provide both the sender and the receiver of a data packet with information about the other parties to the communication, as well as verification that the correct device is receiving the communication.

In other embodiments, the an identity services server may not be involved. For example, the first device can directly contact the second device, e.g., via a beacon signal, which may provide the second identifier. The second identifier can be used for further communications with the second device.

At block 604, the first device transmits a first data packet to the second device. The first data packet comprises a payload and may also include the second identifier. In various embodiments, the first data packet may also include a first identifier that identifies the first device as being the sending device, as well as any other such identification message from an IDS or IDS daemon as described above. The second identifier can be used to in establishing a connection with the second device, where the connection is used to transmit the first data packet.

At block 606, the first device performs actions in a first period of time following communication of the data packet from the first device to the second device. At block 606a, the first device performs a first verification that an acknowledgement of the data packet has not been received from the second device. During various processes, any number of such verifications may be performed. Performing such verification may comprise checking data for each incoming communication to verify that the data does not comprise the acknowledgement of the data packet.

In additional embodiments, performing such verification may involve verifying that no data has been received at the device since a previous check. Still further embodiments may use a memory setting that is adjusted when an acknowledgement is received, special checks on acknowledgement communications, or any other such method for verifying that a particular message is received. Such a check may be performed by an application, by a PNS daemon, or by any other appropriate process of the device.

At block 606b, the first device performs a first retransmission process for communicating the data packet to the second device. This retransmission process may be defined by standard transmission parameters, or by custom user or application settings. In certain embodiments, this retransmission during the first time period may be associated with a time in which transmission of the first data packet is considered of higher importance. The passage of time may lower (attenuate) the importance associated with the data packet arriving at the second device.

At block 608, the first device performs actions for a second period of time following the first period of time. At block 608a, the first device performs a second verification that the acknowledgement of the data packet has not been received from the second device. Any number of such verifications may be performed.

At block 608b, the first device terminates the first retransmission process. The termination may be performed in various ways, e.g., as described herein. The decision to terminate the first retransmission process can be based on various criteria, e.g., based on time. For instance, if the amount of time since the initial transmission is longer than a threshold, the retransmission can be terminated. The threshold can depend on an initial importance of the first data packet.

There may be a delay between the occurrence of an element of the first time period and the beginning of performance of an element of the second period of time, or these elements may follow immediately upon each other. Alternative embodiments may include additional verification checks such that multiple checks for an acknowledgement may occur during any time period described herein.

At block 610, the first device performs actions for a third time period that follows the second time period. In block 610a, the first device identifies a retransmission trigger. Examples of retransmission triggers are described herein. The retransmission trigger may be identified by a process that runs continuously on the first device, or may be a process that runs when retransmission is terminated for a data packet with attenuated priority, where the retransmission is to occur later. In certain embodiments, a process may operate to identify a single trigger that initiates retransmission of multiple data packets, which had previously each gone through the process of blocks 602-608. Each of the multiple data packets can have had an initial retransmission process terminated. The importance of each data packet can be attenuated to wait for a process to identify an appropriate retransmission trigger.

At block 610b, the first device performs a second retransmission process for communicating the data packet to the second device based on the retransmission trigger. As the second retransmission process occurs in response to the trigger, the second retransmission can occur in a power efficient manner. The retransmission can be performed in accordance with the type of retransmission trigger.

In certain embodiments, a retransmission trigger may be managed by an IDS such as IDS 205, a PNS such as PNS 220, a local IDS daemon such as IDS daemon 304, a push daemon such as push daemon 306, an application such as application, a user performance selection, or an operating system module. In other embodiments, any such element or any combination of elements may manage such retransmission triggers. In one embodiment, IDS 205 may provide IDS daemon with a unique identifier for an account associated with the second device. A second data packet that includes the unique identifier may be received by push daemon or sent by push daemon 306 as part of a subsequent communication. The system may identify such a transmission or receipt based on the unique identifier as a trigger for retransmission of the data packet.

Still further, the process may proceed through multiple iterations, such that during a fourth time after identification of a retransmission trigger and after the third time, the system may check for receipt of an acknowledgement of the data packet, and terminate the triggered retransmission process. Then, during a fifth time, the system may identify a second retransmission trigger. This trigger may be different than the trigger of block 610a, and may be any trigger described herein, including triggers based on device battery power levels, communication power states, successes related to other transmissions, attempts in process for other transmissions, or any other such trigger.

In various embodiments, this process may repeat any number of times. In alternate embodiments, a specific number of retransmission attempts may be allowed. There can be a time limit on retransmissions, such as one day, one week, or one month may be set. In various embodiments, after a time limit: an error may be returned; a communication may be made to an IDS, a PNS, or another system identifying the failure; the communication may be dropped; or any combination of actions may be taken.

In an additional example, communication of the data packet may be part of a broader communication. For example, in one embodiment, a user may input a command to an application to synchronize certain files on two or more devices, such as a set of pictures. The application may interact with an IDS to confirm the identities of the devices which may be associated with a single user account. The application may then interact with a PNS to manage security for the synchronization of the pictures. The data packet in various embodiments discussed herein may be a single data packet that is part of a much larger communication of many data packets that make up the files.

When the system determines that an acknowledgement is not received for a first data packet that is part of the file synchronization, or possibly that acknowledgements have not been received from multiple packets that are part of the synchronization, the system may implement retransmission of those packets with attenuated priority, and may also terminate transmission of all other packets associated with the file synchronization. Later, when an acknowledgement is received after a triggered retransmission process, the system may also resume transmission of additional data packets associated with the synchronization. Similar examples of resuming transmissions may be associated with any time of communication, such as the transfer of individual files, streams of information, or any other such communication.

III. PROTOCOL STACK

Figure 7:
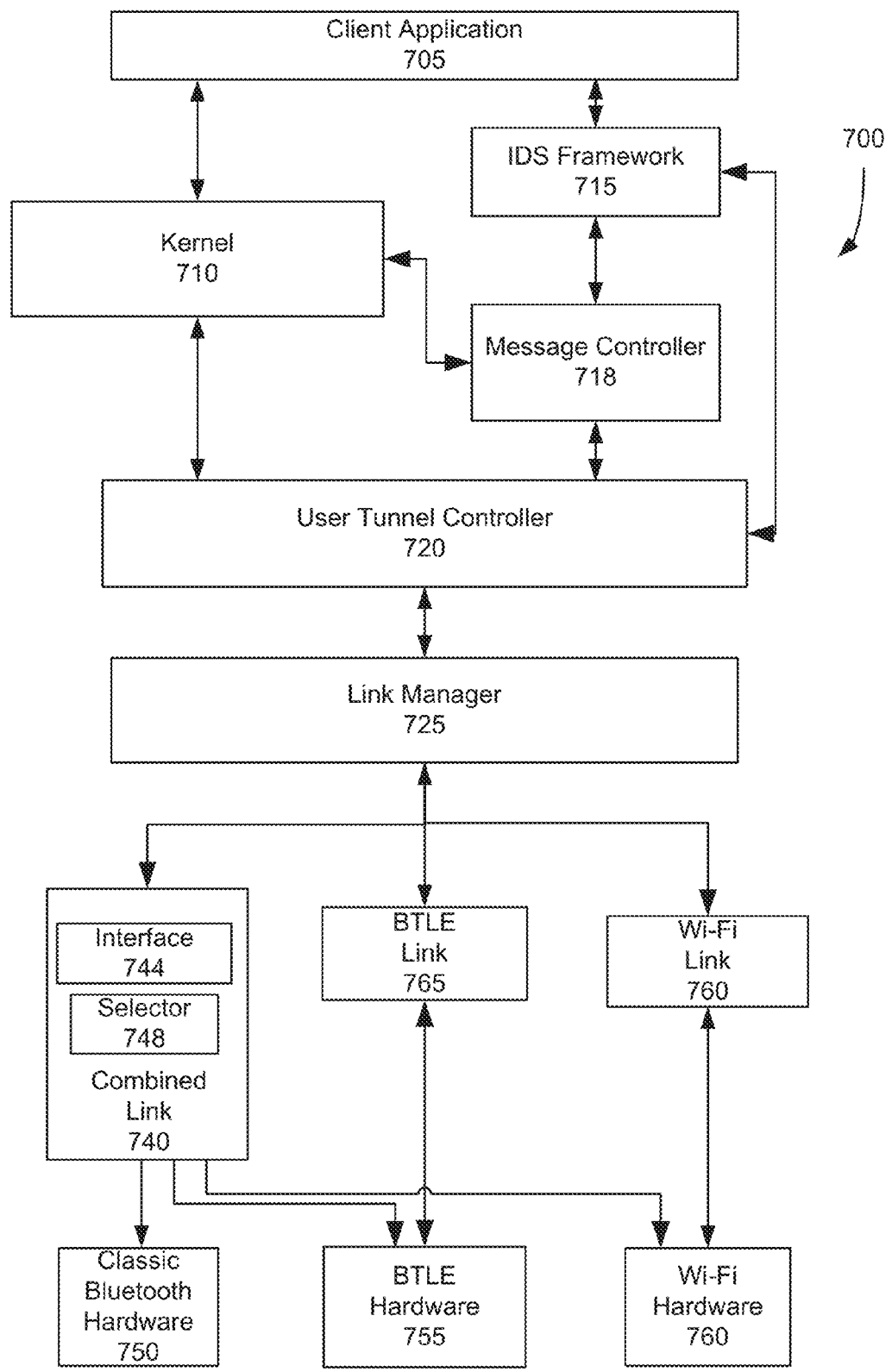
FIG. 7 shows a protocol stack for communicating data according to embodiments of the present invention.

FIG. 7 shows a protocol stack 700 for communicating data according to embodiments of the present invention. In various embodiments, the protocol stack 700 may be implemented as part of first device 300 of FIG. 3, as mobile device 900 of FIG. 9, or as part of any other device described herein. In certain embodiments, the protocol stack 700 may be used to manage retransmission priority either in whole or in part. Various modules in protocol stack 700 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

The communication of data from a device (e.g., mobile device 115, companion device 120, first device 300, or second device 350) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 115 communicating with companion device 120).

In some embodiments, a client application 705 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 705 can submit an open socket request (e.g., in a streaming example). The socket request can use information from an identity services (IDS) framework 715, which can provide an address (or other type of ID) for the other device. For example, client application 705 can know account information for the second device (e.g., account information of a different or same user), and IDS framework 715 can store a list of device IDs for a particular account. IDS framework 715 can be in communication with identity management infrastructure 105 to obtain the list. Thus, IDS framework 715 can store or otherwise obtain device IDs (e.g., addresses) for all devices that a user has registered with ID infrastructure 105. For example, IDS framework 715 can request via an IDS daemon to ID infrastructure 105 to obtain the device IDs. In one implementation, the socket request can be made to kernel 710.

In a messaging example, the request to send data can go to IDS framework 715 to obtain a device ID, which can be sent to message a message controller 718 and a user tunnel (UTUN controller 720. UTUN controller can establish a mapping between the device ID and an IP address (e.g., a virtual IP address) when the device ID is not an IP address.

A socket can be created between message controller 718 (which assigns a device ID to the socket) and kernel 710 (which can assigns an address to the socket, such as a virtual IP address). UTUN controller can be used to create the socket connection between message controller 718 and kernel 710. In this manner, the send-date request from client application 705 does not need to include a device ID, but can specify an account, which can then be cross-referenced by IDS framework 715 with known devices of the account and their capabilities (e.g., if the request requires certain capabilities). Given that a device ID can be obtained, a pairing does not need to occur prior to creating the socket.

In various embodiments, IDS framework 715 can receive a particular port/service at the other device from client application 705, determine the port/service based on information obtained from ID infrastructure 105, or determine the port/service from a token sent in the request. IDS framework 715 can then communicate a device ID and other header information to message controller 718 and/or UTUN controller 720. IDS framework 715 and UTUN controller 720 can communicate via cross process communication (XPC). UTUN controller 720 can be part of an IDS daemon, and can receive a device ID from ID infrastructure 105.

As mentioned above, UTUN controller 720 can create a virtual address that corresponds to the actual device address, where the virtual address can be used to create a virtual socket. A virtual socket can also be created using any device ID (e.g., an actual address of a device or other ID). As an example, a socket can be created for communication between client application 705 and kernel 710 (e.g., in a streaming context), where kernel 710 can have various sockets open with various client applications. Kernel 710 can have a single connection to UTUN controller 720 for the other device and multiplex (mux) the data from various client applications into the single connection. Instead or in addition, UTUN controller 720 can also perform the muxing, e.g., if multiple socket exist between kernel 710 and UTUN controller 720 for various client applications to the other device. Incoming data can be demultiplexed (de-muxed) for sending to the destination client application.

As another example, a socket can be created between kernel 710 and message controller 718 (e.g., in a messaging context), where a socket can be created for each destination device, with different sockets to a same device potentially having different priorities. Thus, a particular virtual socket can be associated with a particular device and a particular priority (e.g., high and low). Message controller 718 can have various connections to various client applications. Thus, message controller 718 can provide mux/demux capabilities.

UTUN controller can create a primary socket with the other device. When UTUN controller 720 receives data using a virtual connection associated with the second device, it can then map the virtual connection to the primary socket for communicating with the other device. All data for the other device can then be sent out through the primary socket. The virtual address for a virtual socket can be passed back to client application 705, e.g., in the stream context. In one embodiment, a virtual socket involving kernel 710 is a TCP socket. The virtual address can have a same format as a regular address, e.g., an IPv6 address. A mux module can include any combination of kernel 710, message controller 718, and UTUN controller 720.

When client application sends data, client application 705 can use the virtual socket to send data to kernel 710. For example, the data can be sent using TCP via the virtual socket. Kernel 710 can implement an UTUN interface for communicating with UTUN controller 720. Kernel 710 would pass the data (e.g., with a TCP header) and the virtual socket identifying the virtual address to UTUN controller 720, which would then use the virtual address to resolve the device address for determining the device socket.

When sending to the data over the device socket, a link manager 725 can determine which link to use. A link can be a particular combination of a wireless interface protocol (e.g., Bluetooth or Wi-Fi), a transport protocol (e.g., TCP, UDP, etc.), and a destination device. In this manner, UTUN controller 720 does not need to know how the data is being sent, but instead can simply send the data to link manager 725.

In various embodiments, the determination by link manger 725 can be made per data packet, per set of data packets, per device socket, and may change from one data packet to another. Link manager 725 may then select a link for sending the data. In the example shown, a Wi-Fi link 730 provides software drivers for communicating with one or more Wi-Fi protocols, and BLTE link 735 provides software drivers for communicating with Bluetooth LE. Wi-Fi link 730 is in communication with Wi-Fi hardware 760, and BLTE link 735 is in communication with BTLE hardware 755. Wi-Fi link 730 can be used for various Wi-Fi protocols, such as infra-Wi-Fi (infrastructure Wi-Fi). In one embodiment, link manager 725 can try all links to determine whether any of the links can contact the other device, and then use a connected link with a highest predetermined rank or dynamic rank.

Hardware 750-360 can be in communication with links assigned to various devices. For example, links 730, 735, and 740 can be assigned for communication with a second device. And, other links that are assigned for communication with a third device can also be in communication with hardware 750-360. When a particular hardware receives data, software can identify a particular sending device and then determine the corresponding link, e.g., using header information to determine the link corresponding to the sending device and transport protocol.

In some embodiments, a combined link 740 can include an interface 744 for communicating with link manager 724 and a selector 748 that selects a particular protocol to use. The protocols can be the same or different than that available to link manager 725. Selector 748 can perform similar functions as link manager 725 in that a particular link is selected. However, link manager 725 and selector 748 can use different criteria for determining which link to use. For example, link manager 725 can determine to use combined link 740, and selector 748 can then determine that BTLE hardware 755 is to be used. The hardware can be contained on a same or separate chips.

One or more protocols can be only available via combined link 740, such as classic Bluetooth hardware 750. Link manager 725 and selector 748 can use various criteria for determining which link to use, such as power usage of a link, speed of a link (e.g., real-time data rate), and signal strength of a link. A goal of the optimization for selecting a link can be to provide a minimal data rate at a lowest possible energy.

IV. ADDITIONAL DEVICE EMBODIMENT

FIG. 9 is a block diagram of a portable electronic device or mobile device 900 according to an embodiment of the invention. Mobile device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. In various embodiments, first device 300 or second device 350 or any other device, server, access point, network element or other computing device or element may be implemented in whole or in part using the elements of FIG. 9.

It should be apparent that the architecture shown in FIG. 9 is only one example of an architecture for mobile device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., Wi-Fi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 916, one or more processors 918, and memory controller 920 can be implemented on a single chip, such as processing system 904. In some other embodiments, they can be implemented on separate chips.

Mobile device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 900 includes a camera 944. In some embodiments, mobile device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, mobile device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 30-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of mobile device 900. Modern positioning systems include satellite based positioning systems, such as Global Positioning System (GPS), cellular network positioning based on "cell IDs," and Wi-Fi positioning technology based on a Wi-Fi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 900 based at least in part on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications 934 can also include a specific app for finding a parked car, a maps application, or any other suitable application.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include automatically marking a parking location when it is determined that a car is in a parked state. This can be done without prompting by the user and therefore the user does not have to remember to manually mark a parking location. This improves the user experience and is more convenient for the user.

Further advantages to certain embodiments of the invention include enabling parking location marking in weak location signal scenarios. Some embodiments of the invention permit marking a car's parking location without using transponders in parking areas (e.g., transponder near parking spots) to transmit a unique identifier which can be used to locate a parking spot.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. Any such computer readable medium may reside on or within a single computer product (e.g. a hard drive, a CD, or an entire computer system), and may be present on or within different computer products within a system or network. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method comprising:
   at a first mobile device comprising wireless circuitry, a memory, and a processor communicatively coupled to the memory and the wireless circuitry:
   communicating, via the wireless circuitry, with an identity management server to receive a second identifier associated with a second mobile device, the identity management server being remote from the first mobile device and the second mobile device;
   transmitting a first data packet to the second mobile device using the second identifier, the first data packet comprising a payload;
   for a first period of time following transmission of the first data packet to the second mobile device:
   performing a first verification that a response has not been received from the second mobile device, wherein the response indicates receipt of the first data packet; and
   performing a first retransmission process for communicating the first data packet to the second mobile device;
   for a second period of time following the first period of time:
   performing a second verification that the response has not been received from the second mobile device;
   storing a copy of the payload for later retransmission; and
   terminating the first retransmission process; and
   for a third period of time following the second period of time:
   identifying a retransmission trigger; and
   performing a second retransmission process for communicating the payload to the second mobile device.

2. The method of claim 1, wherein the retransmission trigger comprises a change in power usage associated with the wireless circuitry.

3. The method of claim 1, wherein the retransmission trigger comprises an acknowledgement of receipt of a second data packet from the second mobile device, wherein the acknowledgement is received at the first mobile device, and wherein the second data packet is different than the first data packet.

4. The method of claim 3, wherein the acknowledgement comprises the second identifier associated with the second mobile device.

5. The method of claim 1, wherein the first data packet further comprises a first identifier associated with the first mobile device, wherein the first identifier is received at the first mobile device from the identity management server.

6. The method of claim 5, wherein the first identifier and the second identifier are each associated, by the identity management server, with a first account, and
   wherein the payload comprises synchronization data for synchronizing one or more files of the first mobile device with one or more files of the second mobile device.

7. The method of claim 5, wherein the first identifier is associated, by the identity management server, with a first account,
   wherein the second identifier is associated, by the identity management server, with a second account that is different than the first account, and
   wherein the payload comprises a read receipt for a text message.

8. The method of claim 1, wherein transmitting the first data packet to the second mobile device comprises:
   communicating, by an application of the first mobile device, with an identity services daemon of the first mobile device to determine identity services information comprising the second identifier;
   communicating, from the application to a push services daemon of the first mobile device, the payload and the identity services information; and
   communicating, from the push services daemon to the second mobile device via the wireless circuitry, the first data packet.

9. The method of claim 1, further comprising, before transmitting the first data packet to the second mobile device:
   determining an importance value associated with the first data packet, wherein the importance value is used to determine one or more actions for the first data packet.

10. The method of claim 9, further comprising, during the second period of time:
    attenuating the importance value associated with the first data packet.

11. The method of claim 1, further comprising:
    at the first mobile device:
    for a fourth period of time following the third period of time:
    performing at least a third verification that the response has not been received from the second mobile device; and
    terminating the second retransmission process; and
    for a fifth period of time following the fourth period of time:
    identifying a second retransmission trigger associated with a second trigger process that is different a first trigger process associated with the retransmission trigger; and
    performing a third retransmission process for communicating the first data packet to the second mobile device based on the second retransmission trigger.

12. The method of claim 1, wherein performing at least the first verification that the response has not been received from the second mobile device comprises:
    receiving data at the wireless circuitry; and
    verifying that the data received at the wireless circuitry does not comprise the response from the second mobile device.

13. A first mobile device comprising:
wireless circuitry;
a memory; and
at least one processor communicatively coupled to the memory and the wireless circuitry, the at least one processor configured to:
communicate, via the wireless circuitry, with an identity management server to receive an identifier associated with a second mobile device, the identity management server being remote from the first mobile device and the second mobile device;
initiate a transmission process for transmitting, from the first mobile device to a second mobile device using the identifier, a first data packet comprising a payload;
determine that a response has not been received from the second mobile device, wherein the response indicates receipt of the first data packet;
terminate the transmission process;
store a copy of the payload for later retransmission;
identify a retransmission trigger associated with the payload; and
initiate a retransmission process to communicate the payload based at least in part on the retransmission trigger.

14. The first mobile device of claim 13, wherein the first data packet further comprises an importance value, wherein the at least one processor is further configure to:
attenuate the importance value after the transmission process is terminated,
wherein the retransmission trigger depends upon the importance value, and wherein identifying the retransmission trigger comprises accessing the importance value in the first data packet.

15. A computer product comprising non-transitory computer readable instructions that, when executed by a first mobile device comprising wireless circuitry, a memory, and a processor communicatively coupled to the memory and the wireless circuitry, cause the processor to perform a method for retransmission of a data packet with attenuating priority, the instructions causing the first mobile device to perform operations comprising:
communicating, via the wireless circuitry, with an identity management server to receive an identifier associated with a second mobile device, the identity management server being remote from the first mobile device and the second mobile device;
initiating a transmission process for transmitting, from the first mobile device to a second mobile device using the identifier, the data packet comprising a payload;
determining that a response has not been received from the second mobile device, wherein the response indicates receipt of the data packet;
terminating the transmission process;
identifying a retransmission trigger associated with the payload;
storing a copy of the payload for later retransmission; and
initiating a retransmission process to communicate the payload based on the retransmission trigger.

16. The computer product of claim 15, wherein the data packet further comprises an importance value, wherein the operations further comprise:
attenuating the importance value after the transmission process is terminated,
wherein the retransmission trigger depends upon the importance value, and wherein identifying the retransmission trigger comprises accessing the data packet.

17. The computer product of claim 15, wherein the operations further comprise:
identifying a plurality of data packets associated with the data packet;
terminating transmission of the plurality of data packets after terminating transmission of the data packet;
receiving the response from the second mobile device after initiating the retransmission process; and
resuming transmission of the plurality of data packets after receiving the response.

18. The computer product of claim 15, wherein identifying the retransmission trigger comprises identifying a transmission of a second data packet to the second mobile device and receiving a second response from the second mobile device indicating receipt of the second data packet.

19. The method of claim 1, further comprising:
performing a third verification that the response has not been received from the second mobile device;
terminating the second retransmission process;
identifying a third device associated with the second identifier; and
performing a third retransmission process for communicating the payload to the third device.

20. The method of claim 10, further comprising, during the third period of time:
further attenuating the importance value associated with the first data packet.

21. The method of claim 9, further comprising:
attenuating the importance value associated with the first data packet over the first period of time, the second period of time, and the third period of time.

22. The method of claim 1, further comprising:
performing a third verification that the response has not been received from the second mobile device; and
identifying a termination trigger; and
terminating the second retransmission process based on the termination trigger.

23. The method of claim 22, wherein the termination trigger is based on an importance value associated with the first data packet.

24. The method of claim 1, wherein terminating the first retransmission process occurs when a threshold amount of time is exceeded between performing the first retransmission process and performing the second verification that the response has not been received from the second mobile device.

25. The method of claim 24, wherein the threshold amount of time is set based on an importance value associated with the first data packet.

* * * * *